United States Patent
Poon et al.

(10) Patent No.: US 10,974,189 B2
(45) Date of Patent: Apr. 13, 2021

(54) SUPPORT MEMBERS FOR FILTER PLEATED MEDIA

(71) Applicant: W. L. Gore & Associates, Inc., Newark, DE (US)

(72) Inventors: Wai Poon, Hockessin, DE (US); Ryder William Pingry, Newark, DE (US); Chinedu David Chikwem, Wilmington, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 292 days.

(21) Appl. No.: 15/775,669

(22) PCT Filed: Nov. 11, 2016

(86) PCT No.: PCT/US2016/061502
§ 371 (c)(1),
(2) Date: May 11, 2018

(87) PCT Pub. No.: WO2017/083628
PCT Pub. Date: May 18, 2017

(65) Prior Publication Data
US 2018/0318747 A1 Nov. 8, 2018

Related U.S. Application Data

(60) Provisional application No. 62/255,205, filed on Nov. 13, 2015.

(51) Int. Cl.
*B01D 46/10* (2006.01)
*B01D 46/52* (2006.01)
(Continued)

(52) U.S. Cl.
CPC ......... *B01D 46/523* (2013.01); *B01D 46/002* (2013.01); *B01D 46/10* (2013.01);
(Continued)

(58) Field of Classification Search
CPC .... B01D 46/523; B01D 46/10; B01D 46/002; B01D 46/125; B01D 2267/30
(Continued)

(56) References Cited

U.S. PATENT DOCUMENTS 4,135,900 A * 1/1979 Westlin ............... B01D 46/523
210/493.3
8,147,583 B2 4/2012 Gebert et al.
(Continued)

FOREIGN PATENT DOCUMENTS

| JP | 2002-233726 A | 8/2002 |
| JP | 2005-152814 A | 6/2016 |
| WO | WO-2014/044324 A1 | 3/2014 |

OTHER PUBLICATIONS

International Search Report and Written Opinion issued in Application No. PCT/US2016/061502 dated Feb. 22, 2017.

*Primary Examiner* — Minh Chau T Pham
(74) *Attorney, Agent, or Firm* — Greenberg Traurig, LLP (57) ABSTRACT

Systems and methods of filtering with filter assemblies including a frame having a header structure, an end cap structure, and a plurality of side plates coupling the header structure to the end cap structure are provided. The filter pleated media may include an upstream surface and a downstream surface opposite the upstream surface in a direction of flow through the filter assembly, and the filter pleated media may include a pleated configuration. The filter assemblies may further include a support member coupled to a portion of the frame and along at least one of the upstream surface or the downstream surface of the filter pleated media. The support member may at least partially penetrate the pleated configuration and extend into a pleat of the pleated configuration of the filter pleat media.

6 Claims, 5 Drawing Sheets

(51) Int. Cl.
*B01D 46/12* (2006.01)
*B01D 46/00* (2006.01)

(52) U.S. Cl.
CPC ........ *B01D 46/125* (2013.01); *B01D 2265/06* (2013.01); *B01D 2267/30* (2013.01)

(58) Field of Classification Search
USPC .......................... 55/490, 497, 498, 502, 521
See application file for complete search history.

(56) References Cited

U.S. PATENT DOCUMENTS

| | | | |
|---|---|---|---|
| 8,231,700 | B2 | 7/2012 | Sundet |
| 8,328,895 | B2 | 12/2012 | Nicholas |
| 10,071,331 | B2 * | 9/2018 | Hedlund ............ B01D 46/0019 |
| 2005/0284116 | A1 * | 12/2005 | Duffy .................. B01D 46/521 |
| | | | 55/497 |
| 2006/0053759 | A1 * | 3/2006 | Winters ............ B01D 46/0016 |
| | | | 55/497 |
| 2011/0252759 | A1 | 10/2011 | Nicholas |
| 2011/0308213 | A1 * | 12/2011 | Gillispie ................ B01D 46/10 |
| | | | 55/499 |
| 2012/0067013 | A1 | 3/2012 | Antony et al. |
| 2014/0096493 | A1 | 4/2014 | Kelmartin et al. |

* cited by examiner

SUPPORT MEMBERS FOR FILTER PLEATED MEDIA

CROSS REFERENCE TO RELATED APPLICATIONS

This application is a U.S. National Stage of International Application No. PCT/US2016/061502, filed on Nov. 11, 2016, which claims priority from U.S. Provisional App. No. 62/255,205, entitled "Support Members for Filter Pleated Media," filed Nov. 13, 2015, the disclosure of which are incorporated herein by reference in its entirety.

FIELD OF THE INVENTION

The present invention relates to support members. More specifically, the present invention relates to support members for filter pleated media.

BACKGROUND OF THE INVENTION

Filter technology is utilized in many applications and environments, from protecting manufacturing and building equipment, to improving air and water quality. Due to the myriad of filtering applications, filters must be compatible with the characteristics of the environment in which they are installed. The environment may include, for example, corrosive or toxic material or otherwise harsh conditions such as extreme temperature or pressure. For these reasons, it is often necessary to test filter media under a variety of operating conditions such as high temperature and/or high pressure. Many filter designs prove unsuitable for these environments due to the inability of the filter media to withstand the operating conditions or maintain operational requirements during testing.

WO2014/044324 discloses a backing net for a filter media. The backing net comprises a plurality of longitudinal beams and at least one cross beam. The height of at least one of the longitudinal beams varies along the length of the longitudinal beam such that the height is reduced towards the first end thereof. The disclosure also relates to a filter media and a V-type filter having such a backing net.

U.S. Pat. No. 8,328,895 discloses a filter media pleat pack retention that is attained by providing a filter media pleat pack having a joining member located between a first filter media portion and a second filter media portion. The first filter media portion is coupled to the joining member at one side and the second filter media portion is coupled to the joining member at an opposite side. The joining member provides stiffness to the filter media pleat pack and provides support to the panel stopping excessive bowing under high pressure and subsequent tearing and puncture.

US Pub. No. 2011/0252759 discloses a filter assembly that includes a frame that defines a rectangular opening. A channel is disposed about at least a portion of the periphery of the rectangular opening. A filter media pleat pack extends across the entire rectangular opening of the frame. The filter media pleat pack separates particles from a gas flowing through the filter media in a first direction. A support structure is connectable with the frame and engages the filter media pleat pack to limit movement of the filter media pleat pack when gas flows in the first direction through the filter media.

A continuing problem that exists with many commercially available filter packs is filter deflection and/or failure under high pressure loads. Thus, the need exists for improved filter media and, in particular, to improved methods and systems for filtering materials and fluids. These and other needs are addressed by the present invention.

SUMMARY OF THE INVENTION

In one embodiment, the invention is directed to a filter assemblies comprising a filter assembly, comprising a frame having a header structure, an end cap structure, and a plurality of side plates coupling the header structure to the end cap structure; a filter pleated media coupled to the plurality of side plates, wherein the filter pleated media comprises an upstream surface and a downstream surface opposite the upstream surface in a direction of flow through the filter assembly, and wherein the filter pleated media comprises plurality of pleats in a pleated configuration; and a support member coupled to a portion of the frame, and positioned along at least one of the upstream surface or the downstream surface of the filter pleated media, wherein the support member at least partially penetrates the pleated configuration.

In another embodiment, the invention is to a V-panel filter assembly, comprising a frame having a header structure and an end cap structure, wherein a plurality of side plates couple the header structure with the end cap structure, and wherein the end cap structure comprises an end cap coupled to two of the plurality of side plates; two filter pleated media coupled to the plurality of side plates, wherein each of the filter pleated media comprises an upstream surface and a downstream surface opposite the upstream surface in a direction of flow through the filter assembly, wherein each of the filter pleated media comprises a pleated configuration between a top of the filter pleated media and a bottom of the filter pleated media, and wherein each of the filter pleated media is coupled to the header structure and the end cap in a tapered configuration, wherein the filter pleated media comprises plurality of pleats in a pleated configuration; and at least two support members each coupled to and along the at least one of the upstream surface or the downstream surface of each of the filter pleated media, wherein at least a portion of each of the at least two support members at least partially penetrates within the pleated configuration and extends within a pleat of the pleated configuration of the filter pleated media.

In another embodiment, the invention is to a filter assembly comprising a filter pleated media, wherein the filter pleated media comprises an upstream surface and a downstream surface opposite the upstream surface in a direction of fluid flow through the filter assembly, and wherein the filter pleated media comprises a pleated configuration; and a support member coupled to at least one of the upstream surface or the downstream surface of the filter pleated media, wherein at least a portion of the support member extends within a pleat of the pleated configuration of the filter pleated media.

In another embodiment, the invention is to a filter assembly comprising a filter pleated media, wherein the filter pleated media comprises an upstream surface and a downstream surface opposite the upstream surface in a direction of fluid flow through the filter assembly, and wherein the filter pleated media comprises a pleated configuration; and a support member coupled to the upstream surface of the filter pleated media, wherein at least a portion of the support member extends within a pleat of the pleated configuration of the filter pleated media.

In another embodiment, the invention is to a filter assembly comprising a filter pleated media, wherein the filter pleated media comprises an upstream surface and a downstream surface opposite the upstream surface in a direction of fluid flow through the filter assembly, and wherein the filter pleated media comprises a pleated configuration; and a support member coupled to the downstream surface of the filter pleated media, wherein at least a portion of the support member extends within a pleat of the pleated configuration of the filter pleated media.

The present invention also includes V-panel filter assemblies that may include a frame structure. The frame structure may include a header structure and an end cap structure, where a plurality of side plates couple the header structure with the end cap structure. The end cap structure may include an end cap coupled to two of the plurality of side plates, e.g., top side plate and bottom side plate. The filter assemblies may include two filter pleat pack fixedly coupled, with the plurality of side plates, and each of the filter pleat pack may be characterized by an upstream surface and a downstream surface opposite the upstream surface in a direction of fluid flow through the filter assembly. Each of the filter media may include a pleated configuration between a top of the filter media and a bottom of the filter media, and each of the filter media may be coupled to the header structure and the end cap in a tapered configuration. The filter assemblies may include at least two support members coupled between the header structure and the end cap along the downstream surface of each of the filter media. In one embodiment, at least a portion of each of the plurality of support members may at least partially penetrate the pleated configuration and extend within one pleat of the pleated configuration of the filter media. The plurality of support members may each be positioned substantially equidistant from at least one other support member and the top or the bottom of the filter media, or from at least two other support members in one embodiment of the present invention.

In one embodiment, the filter media may include a membrane, cellulose microfiberglass, meltblown, spunbond, or composite of these materials. In one embodiment, the support members may restrict no more than about 30% of the downstream surface area of the filter media. The filter media within the frame may each be configured to deflect outwardly to no more than 20 mm from a vertical axis of the filter media with a fluid pressure at the upstream surface of the filter media of at least 1 kPa. The V-panel filter assemblies may be configured to substantially maintain their structure against a differential pressure of about 62.5 kPa or more.

In other embodiments, the present invention relates to methods of filtering a fluid. In one embodiment, for example, the invention is to a method of filtering a fluid, the method comprising receiving the fluid at a filter assembly, wherein the filter assembly comprises a frame having a header structure and an end cap structure, wherein a plurality of side plates couple the header structure with the end cap structure, a filter pleated media coupled to the plurality of side plates, wherein the filter pleated comprises an upstream surface and a downstream surface opposite the upstream surface in a direction of fluid flow through the filter assembly, and wherein the filter pleated media comprises a pleated configuration, and a support member coupled to a portion of the frame, and positioned along at least one of the upstream surface or the downstream surface of the filter pleated media, wherein the support member at least partially penetrates the pleated configuration and extends within a pleat of the pleated configuration of the filter pleated media; and filtering the fluid by the filter assembly, wherein the fluid causes a deflection from a vertical axis of the filter pleated media of less than about 25 mm at any position along the filter pleated media.

The methods may also include filtering the fluid by the filter assembly, where the fluid causes a deflection from a vertical axis of the filter media of no more than about 25 mm at any position along the filter media. The filter assembly may be configured to substantially maintain its structure against a differential pressure exerted by the fluid of at least about 62.5 kPa. Additionally, the support member may cause a differential pressure increase across the filter media in operation of no more than 10 percent more than the differential pressure across the filter media in absence of the support member.

A width of the support members of the filter assemblies may be similar to the width of a single pleat of the filter media. In one embodiment, the support member may include a T-shape cross-section having a first portion extending along the downstream surface of the filter pleat pack, and a second portion extending into the pleated configuration within a pleat of the filter pleat pack. The first portion may define at least one aperture. The filter assemblies may include two or more support members, and the two or more support members may be coupled to one another on at least one end of each support member by a bridge member. The bridge member may be characterized by a plurality of tabs along a length of the bridge member, and the bridge member may define a gap between tabs of the plurality of tabs.

These embodiments described herein may provide numerous benefits over conventional techniques. For example, the present invention may allow filtering in high pressure applications without the concern for structural deflection of the filter. Additionally, the embodiments of the present invention provide improved filter support with a low or negligible increase in differential pressure across the filter. These and other embodiments, along with many of their advantages and features, are described in more detail in conjunction with the below description and attached figures.

BRIEF DESCRIPTION OF THE DRAWINGS

The present invention will be better understood in view of the appended non-limiting figures.

DETAILED DESCRIPTION OF THE INVENTION

Filter panels and assemblies are utilized in a host of applications in which particular high performance operational characteristics are required of the filter. For example, V-panel filters are commonly used in applications for removing airborne particles to protect gas turbines from erosion, fouling and performance loss. Because of the technical precision of these turbines, it is typically necessary for filter assemblies to prevent most materials from passing therethrough. A common filter size for V-panel filters is roughly 600 by 600 mm in width and height at the upstream surface or header where air enters. The filters used may have a pleated configuration which forms pleat packs. The pleat density, e.g., number of pleats, may vary depending on the filter assembly, but commonly ranges from 4 to 500 pleats per filter media. With the width and height determined, the depth of the filter dictates the airflow rate that the filter can typically handle. For example, a 300 mm deep filter generally may handle roughly 3400 $m^3$/hr; a 400 mm deep filter may handle roughly 4,250 $m^3$/hr; and a 600 mm deep filter may handle upwards of 5,100 $m^3$/hr in certain scenarios.

An issue that may occur when extending the filter depth is that with the added distance to the pleat pack, the filter pleated media may be more likely to deform under pressure. That is, as the pleat pack is stressed, it may deform under the load, leading to undesirable loss of filter media area, and in certain scenarios, resulting in filter failure. Additionally, the stress may be transferred to all parts of the filter assembly, including the media, the potting, and the frame, further increasing the number of failure points in the filter assembly. One method for testing includes subjecting the filter to dust and water for 72 hours and then testing the filter up to 62.5 kPa of differential pressure. The force exerted on each pleat pack may be 2250 N or more. Such excessive force can cause failure of one or more of the media, potting, and/or frame for filters that are not protected. Under extreme conditions, the filter assembly can break apart allowing dust and water to pass therethrough.

Introduction

The present invention addresses filter weakness by providing support members along the upstream and/or downstream surface of a filter pleated media. The support members provide structural integrity to the filter pleated media, while also having a negligible effect on differential pressure across the filter assembly. The support member configuration resists the outward force exerted on the filter pleated media under pressure, while minimizing the impact on filter performance.

In one embodiment, the support members may be oriented along the upstream surface of the filter pleated media. Placing the support members on the upstream surface may be advantageous in order to, for example, avoid foreign object damage to any downstream units. In this and other embodiments, the support members may be potted to the pleats.

In another embodiment, the support members may be oriented along the downstream surface of the filter pleated media. This configuration may ease manufacturing in that the support members may or may not be potted to the pleats. For purposes of this disclosure, the support member will primarily be shown and described on the downstream surface, but it should be understood that the support member may additionally or alternatively be oriented along the upstream surface. In further embodiments, support members may be provided on both the upstream and downstream surfaces.

In one embodiment, the filter assembly may include greater or fewer components depending on the application. For example, a filter assembly may include a filter pleated media characterized by an upstream surface and a downstream surface opposite the upstream surface in a direction of fluid flow, e.g., airflow, through the filter assembly. The filter pleated media is characterized by having a pleated configuration. A support member may be coupled to the upstream surface and/or downstream surface of the filter pleated media, and at least a portion of the support member may engage the pleated configuration and extend within a pleat of the pleated configuration of the filter pleated media. The filter assemblies may or may not include a header structure or end cap structure.

The support members and filter assemblies of embodiments of the present invention will now be described with reference to the figures identified above.

Figure 1A:
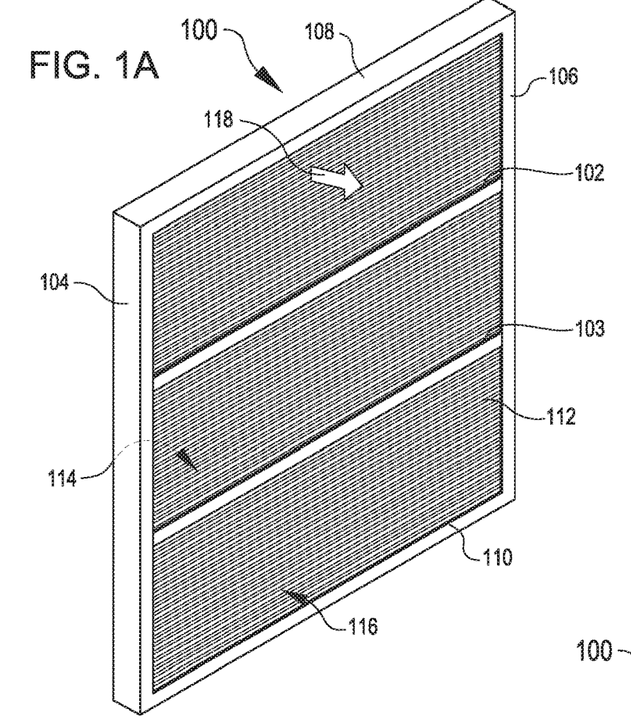
FIG. 1A shows a perspective view of a filter assembly including support members in a horizontal position according to embodiments of the present invention.

FIG. 1A illustrates a perspective view of a filter assembly 100 including support members 102, 103 according to one embodiment of the present invention. The illustrated filter assembly 100 includes a header plate 104 and an end plate 106. Additionally, the filter assembly 100 includes a top side plate 108 and bottom side plate 110. The top side plate and bottom side plate couple header plate 104 to the end plate 106. Positioned within the filter assembly 100 is a filter pleated media 112. In one embodiment, filter pleated media 112 extends continuously from top side plate 108 to bottom side plate 110 and filter pleated media 112 is coupled to top side plate 108 and bottom side plate 110. Likewise, filter pleated media 112 may additionally or alternatively extend continuously from header structure 104 to end cap structure 106, and filter pleated media may be coupled to header structure 104 and to end cap structure 106. Filter pleated media 112 has an upstream surface 114 and a downstream surface 116 opposite to the upstream surface 114 in a direction of fluid flow 118 through filter assembly 100.

Figure 1B:
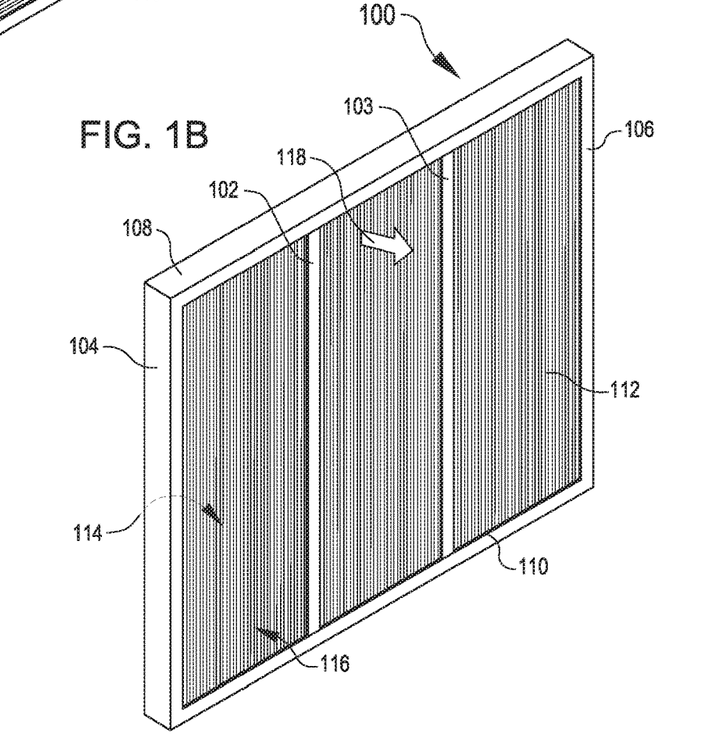
FIG. 1B shows a perspective view of a filter assembly including support members in a vertical position according to embodiments of the present invention.

As described further herein, filter pleated media 112 may be characterized by having a number of filter configurations, which may include a pleated configuration. In one embodiment, as shown in FIG. 1A, supports members 102, 103 are provided in a horizontal position and are aligned with the pleated configuration of the filter pleated media. In another embodiment, as shown in FIG. 1B, supports members 102, 103 are provided in a vertical position and are aligned with the pleated configuration of the filter pleated media. It is to be understood that although a pleated configuration will be discussed throughout, any variety of filter surface configurations may be employed, and are encompassed by, the present disclosure.

Support Members

Still referring to FIGS. 1A and 1B, the filter assembly may also include support members 102, 103 coupled to or between header plate 104 and end plate 106 along downstream surface 116 of filter pleated media 112. Support members 102, 103 each extend along downstream surface 116 and does not penetrate through filter pleated media 112.

Extending a support member through filter pleated media 112 is disadvantageous because then the filter pleated media 112 is no longer continuous and extra processing step(s) for potting the filter pleated media to the support member would be required. Embodiments of the present invention advantageously avoid these extra processing steps. Further, when filter pleated media 112 has a pleated configuration, support members 102, 103 may extend into the pleats, but not through filter pleated media 112.

In exemplary embodiments, when support members 102, 103 are positioned on a downstream surface 116, no portion of support members 102, 103 is on upstream surface 114 of filter pleated media 112.

In other embodiments, support member may be position along an upstream surface 114 of filter pleated media 112. Likewise, when support members 102, 103 are positioned on an upstream surface 114, no portion of support members 102, 103 are on downstream surface 116 of filter pleated media 112.

The support members may be aligned with the pleats of the filter pleated media. This allows a portion of the support member to extend into the pleats and provide the structural integrity. When the pleats have a horizontal configuration the support members may be positioned in a horizontal direction. Likewise when the pleats have a vertical configuration the support members may be positioned in a vertical direction. In other words the support members do not cross in a different direction because this would prevent a portion of the support member from extending into the pleats.

Although two support members 102, 103 are shown in FIGS. 1A and 1B, in other embodiments, the filter assembly may include one or more support members, e.g., from 1 to 10, from 2 to 10, from 2 to 8, from 3 to 8 or from 3 to 5 support members. The number of support members may vary widely and depends largely on the filter media material employed as well as the size and shape of the support members and the conditions under which such filter media will be used. It is to be understood that although more support members provide additional rigidity to the filter media, an increased number of support members may also cause an undesirable increase in pressure drop across the filter media. Additionally, in one embodiment where multiple support members are utilized with the filter assembly, the support members may have a similar design, or may have different designs from one another. The designs of support member include designs having a cross section that is a T-shape, U-shape, Y-shaped, I-shaped, or π-shaped, as well as other designs described below.

Depending on the size, orientation, and filter demands of the application at issue, the spacing of the support members may vary widely so as to provide the desired degree of structural support to the filter assembly and filter pleated media. In one embodiment, when two or more support members, e.g., in a parallel orientation, are disposed along the upstream surface and/or the downstream surface of the filter pleated media, these support members may be positioned or spaced apart from one another and/or from the nearest parallel frame member (e.g., side plate, header, or end cap) in an equidistant manner or non-equidistant manner. In some embodiments, the support members may be positioned substantially equidistant from at least one other support member and the top or bottom of the filter pleated media, or from at least two other adjacent support members. This positioning allows for even spacing along the filter pleated media to maximize structural integrity. For example, if two support members are included along the downstream surface of the filter pleated media, these supports members may be positioned at 200 mm and 400 mm from the top of a filter pleated media having a 600 mm height. In addition, for example, if three support members are included along the downstream surface of the filter pleated media, the support members may be positioned at 150 mm, 300 mm and 450 mm from the top of a filter pleated media having a 600 mm height. In this and other embodiments, substantially equidistant means that the distance between support members is within ±50 mm (measured perpendicular to the support members). In further embodiments, the distance between support members may be within the range of ±40 mm, ±30 mm, ±20 mm, ±10 mm, or ±5 mm.

Regardless of the number of support members positioned along the filter pleated media, the one or more support members may individually or collectively restrict no more than about 30% of the upstream and/or downstream surface area of the filter pleated media, e.g., no more than about 25%, e.g., no more than about 20%, no more than about 15%, no more than about 10%, or no more than about 5% of the upstream and/or downstream surface area, based on the filter face dimension (non-extended pleats in normal pleated configuration). Restricting larger amounts of the upstream and/or downstream surface area may undesirably limit the effectiveness of the filter pleated media.

The fluid to be filtered may include one or more fluids including a vapor, air, liquid, or combination thereof. Non-limiting examples of fluids include water, liquid or vapor chemicals, or any other fluid capable of being filtered by the filter assembly. The fluid may exert or may be caused to exert an amount of pressure on the filter assembly, and the filter assembly may be configured to substantially maintain its structure against the differential pressure exerted by the fluid. Differential pressures that may be exerted may be greater than fluid pressures of at least about 1 kPa, e.g., at least about 10 kPa, at least about 25 kPa, at least about 40 kPa, at least about 60 kPa, at least about 100 kPa, and may include operations having a fluid pressure of at least about 62.5 kPa. The one or more support members may cause a differential pressure increase across the filter pleated media during the filtering operation of no more than about 25 percent relative to the differential pressure across the filter pleated media in the absence of the plurality of support members. In some embodiments, the one or more support members may cause a differential pressure of no more than about 20 percent, e.g., no more than about 15 percent, no more than about 10 percent, no more than about 5 percent, no more than about 3 percent, no more than about 1 percent, from 0 to 1 percent, or about 0 percent (negligible increase).

Figure 2:
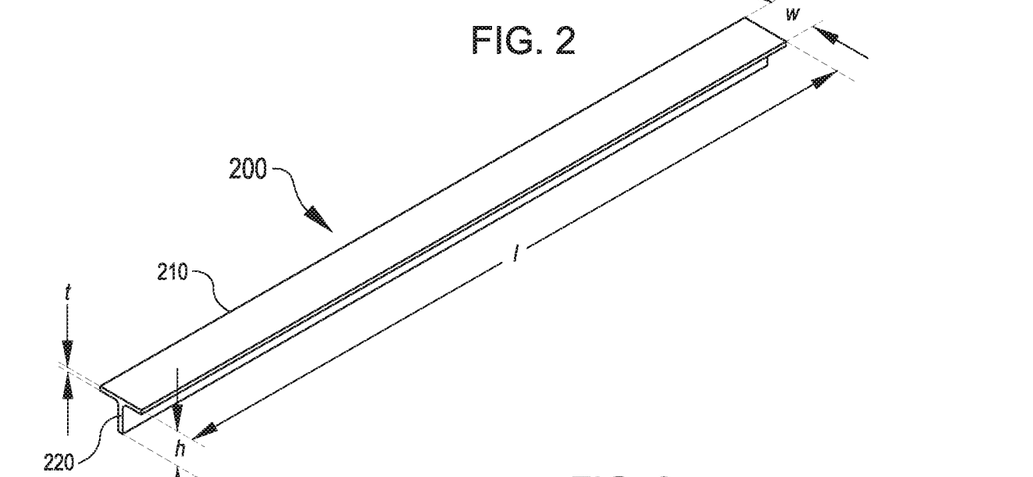
FIG. 2 shows a perspective view of a support member according to embodiments of the present invention.

FIG. 2 illustrates a perspective view of a support member 200 according to some embodiments of the present invention. As shown, support member 200 includes a T-shape cross-section having a first portion 210 (base portion) extending along the downstream surface of the filter pleated media as previously described. Support member 200 may also include a second portion 220 (flange portion) that may extend into the pleated configuration of the filter pleated media.

The dimensions of the support members may depend on the application, where applications having greater fluid pressures may require larger and/or thicker support members. Additionally or alternatively, those applications with greater fluid pressure may include a greater number of support members. Additionally, the characteristics of the filter pleated media with which the support member is being coupled may affect the dimensions of the support member. In one embodiment, each support member 200 may be characterized by having a width (w) of first portion 210, or a height along a height of the filter pleated media, of no more than about 100 mm. The width of first portion 210 may also be no more than about 75 mm, e.g., no more than about 50 mm, no more than about 25 mm, no more than about 19 mm, no more than about 10 mm, or no more than 5 mm. In one embodiment, the width of first portion 210 may range from 1 to 100 mm, e.g., from about 5 to about 75 mm, from about 15 to about 75 mm or from about 20 to about 50 mm. The width may also be similar or equal to the width of a number of pleats of the filter pleated media, and may be similar or equal to the width of a single pleat of the filter pleated media. Thus, for example, if the pleat width of a particular pleated filter pleated media is 18 mm, the width of the support member, or width of first portion 210, may be 18 mm as well, or may be within a few percent (such as within 20%) of the width of the first portion, e.g., from 15 mm to 21 mm, e.g., from 16 to 20 mm.

The overall length (l) of support member 200 may also be determined based on the characteristics and dimensions of the filter pleated media. In one embodiment, the length of the support member 200 extends continuously for at least the length of the filter pleated media. In another embodiment, if the length of the filter pleated media, or depth between the header structure and end cap structure is 600 mm, the length of the support member may be 600 mm, or within a few percent of the length of the support member, e.g., between 590 mm and 620 mm where the length is about 600 mm, which may include an additional length for coupling, for example, with the header structure or end cap structure. It is to be understood that the support member length can be any other length for any other filter length, or may have a length of any other amount greater or less than the length of the filter pleated media with which it is being coupled.

The height (h) of the support member, or the amount it may extend within the pleated configuration, may be greater than or less than the height of the support member. For example, support member second portion 220 may have a height of no more than about 100 mm, e.g., no more than about 75 mm, no more than about 50 mm, no more than about 25 mm, no more than about 19 mm, no more than about 10 mm, or no more than about 5 mm. In one embodiment, the width of first portion 210 may range from about 1 to about 100 mm, e.g., from about 5 to about 75 mm, from about 15 to about 75 mm, or from about 20 mm to about 50 mm. The height of second portion 220 may be an overall height of the support member 220, and may include a measurement from the end of the second portion 220 through the first portion 210.

The thickness (t) of the first portion 210 and the second portion 220 of support member 200 may be similar to one another or different, and may be no more than about 10 mm. In one embodiment, the thickness may be no more than about 8 mm, e.g., no more than about 6 mm, no more than about 4 mm, or no more than about 2 mm. In some embodiments, thicker support members may be used.

Figures 3, 4A, 4B:
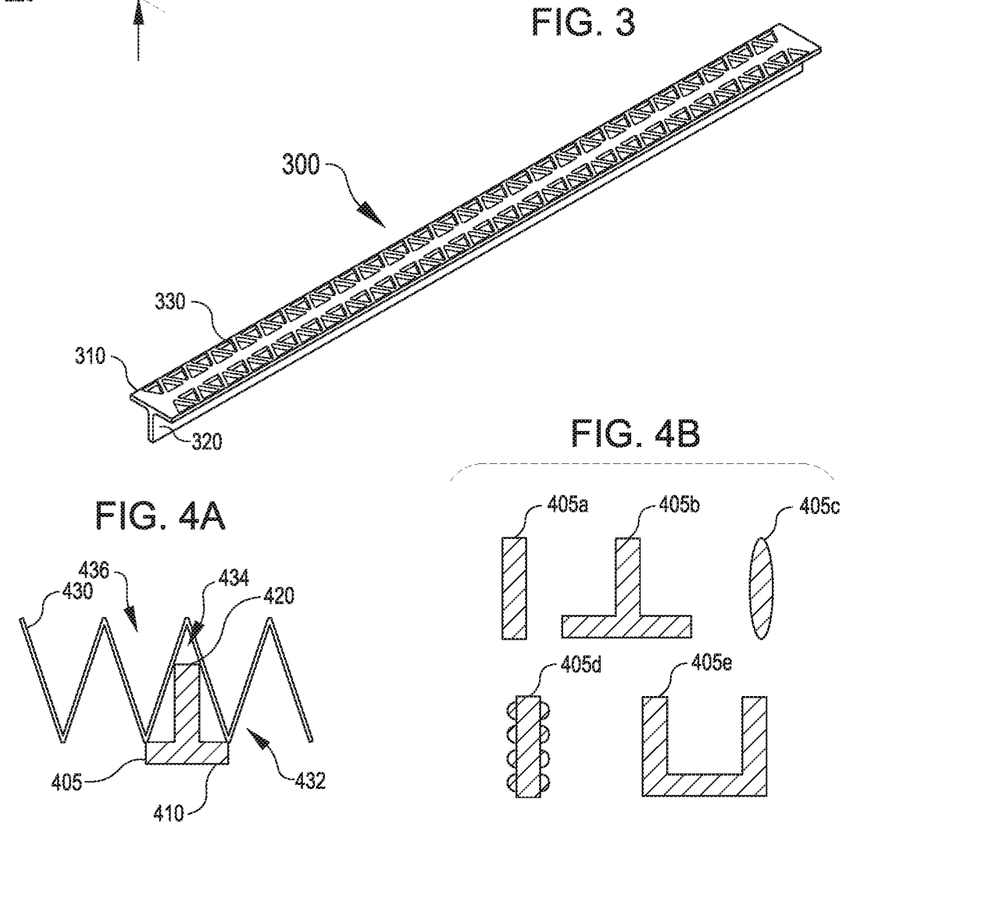
FIG. 3 shows a perspective view of a support member according to embodiments of the present invention.
FIG. 4A shows a cross-sectional view of a filter media coupled to a support member according to embodiments of the present invention.
FIG. 4B shows cross-sectional views of support members according to embodiments of the present invention.

FIG. 3 illustrates a perspective view of an additional support member 300 according to another embodiment of the present invention. Support member 300 may be similar to support member 200, and may similarly include a first portion 310 and a second portion 320. Support member 300 additionally shows apertures 330 defined in first portion 310 of support member 300. In one embodiment, support members may define at least one aperture in either or both of the first portion or second portion of the support members, and may include a plurality of apertures along the length of the support member. The apertures defined in the support members may have any number of geometries, such as the triangular geometry illustrated, or geometries that include but are not limited to circles, ovals, trapezoids, squares, rectangles, diamonds, slits, and combinations thereof. In addition, the apertures may be of any suitable dimension. For example, rows of apertures may be defined within the support member as illustrated, or one or more larger apertures may be defined in the support member, such as two or more rectangular apertures that extend for a distance along the support member, or across the majority of the height. The apertures may be included with the support member to allow increased flow at the sections of the filter pleated media where a support member is positioned, although the apertures may reduce the amount of support provided in comparison to a solid support member. Accordingly, different applications may include from no apertures to a plurality of apertures based on the specific characteristics of the application.

FIG. 4A illustrates a cross-sectional view of a filter pleated media 430 coupled to a support member 405 according to some embodiments of the present invention. As illustrated, support member 405 includes a first portion 410 (base portion) that runs along the downstream surface 432 of the filter pleated media 430. The illustrated support member 405 additionally includes a second portion 420 (flange portion) that extends into a pleat 434 of the filter pleated media 430. Second portion 420 may contact the valley formed within pleat 434. As shown in FIG. 4A, second portion 420 does not extend through the pleated configuration to upstream surface 436. As discussed previously, second portion 420 of support member 405 may penetrate into the pleat 434, but may not penetrate the actual filter pleated media 430 having the pleated configuration, as illustrated. Second portion 420 may extend within a pleat 434 of the filter pleated media 430, and may engage the filter pleated media or be seated within the pleats. For example, potting material may also be included within the pleat coupling the second portion 420 of support member 405 to provide a seating within the filter pleated media. Potting material may be provided continuously across the entire length of the support member 405 or at distinct intervals along the media.

FIG. 4B shows cross-sectional views of additional support members 405a-e according to various embodiments of the present invention. As illustrated, exemplary support members may include one or more sections that contact the filter pleated media. In one embodiment, the design of the support member comprises at least a flange member that extends into the pleats. For example, support members 405a, 405c, and 405d include only a single flange portion, similar to second portion 420 described previously. Such embodiments may have lower operational requirements than other applications, but may still benefit from one or more support members within the filter pleated media. The ridges on support members 405d may provide additional structural integrity to the filter pleated media. Support members 405b and 405e, however, include at least two portions, base and flange, to provide additional support to the filter pleated media. For example, support members 405e may include two portions similar to second portion 420 described previously. Thus, such a support member may have flange portions extending into two separate pleats of the pleated configuration, which may optionally comprise two adjacent pleats. The dimensions of the various support member designs may include portions to produce a desired stiffness or support. For example, the T-shape design may have an additional increase in pressure drop across the filter in certain scenarios, while non-T-shape linear designs may restrict less flow. Additionally, the linear designs, such as support members 405a, 405c, and 405d may be made at an increased width in order to provide similar structural support as the T-shape design. The end of the flange portion may be blunt, curved (arcuate) or come to a point, depending on the on desired contact surface area between the flange portion and the pleat in which it has been inserted. Certain asymmetrical designs additionally may be made with consideration for twisting or torque that may be produced at higher differential pressures.

The support members may be coupled to the frame and/or the filter pleated media in one embodiment. In other embodiments, the support members may be coupled to the header structure and/or end cap structure. For example, the support members may be coupled underneath the header and end cap and may be coupled at the underside of a lip or ledge of the header or end cap. Additionally, one or both ends of the support members may include a tab that extends within the header structure or end cap structure to provide a larger surface for coupling. These and other support member configurations will be discussed below.

Any of the couplings discussed herein may include or utilize a potting material to join components with one another, and may include sealing the filter pleated media within the filter assembly. In one embodiment, the couplings may result in a fixed coupling. The potting material may be a curable potting material and may include a variety of materials. Suitable potting materials may include urethanes, silicone, epoxy, polyvinylchloride (PVC) hot melts, plastisol, methyl methacrylate, cyanoacrylate, or fluorosilicone, or combinations thereof. The potting materials used may be poured into the frame prior to coupling. If a curable potting material is utilized, the potting material may be cured by any of a number of approaches, including for example, heat, induction, UV, anaerobic conditions, solvent evaporation, and moisture.

During filtering operations and/or testing, the support members may inhibit and/or prevent deflection of the filter pleated media, and aid in maintaining the overall filter assembly structure. The support members utilized according to the present invention allow a filter assembly or V-panel filter assembly to substantially maintain its structure against a differential pressure of at least 62.5 kPa. To substantially maintain the filter assembly structure, the support members may prevent catastrophic failure of the filter assembly, or may prevent an outward deflection of the filter pleated media beyond a threshold at any point along the filter pleated media. Thus, the embodiments of the present invention advantageously allow a filter pleated media to substantially maintain its structure. For example, the support members may limit or even prevent the outward maximum deflection of the filter pleated media on the downstream surface to no more than about 50 mm, and in some embodiments may limit the outward maximum deflection to no more than about 40 mm, e.g., no more than about 30 mm, no more than about 20 mm, no more than about 10 mm, no more than about 5 mm, no more than about 1 mm, or provide no detectable deflection. The maximum deflection may be measured from a vertical axis of the filter pleated media from end to end of the filter assembly. The measuring of the maximum deflection may be performed at a fluid differential pressure at the upstream surface relative to the downstream surface of the filter pleated media of at least about 1 kPa, or in some embodiments at least about 10 kPa, e.g., at least about 20 kPa, at least about 30 kPa, at least about 40 kPa, at least about 50 kPa, at least about 60 kPa, at least about 70 kPa, or at least about 100 kPa. The maximum deflection may be tested after a fixed or varied period of time.

V-Panel

Figure 5A:
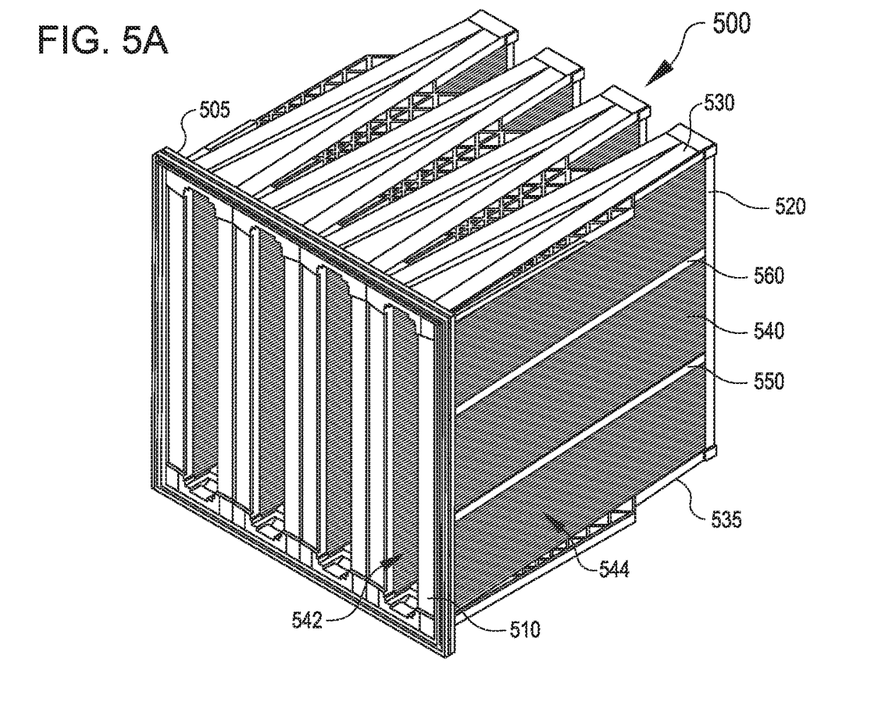
FIG. 5A shows a perspective view of a filter assembly including support members in a horizontal position according to embodiments of the present invention.
Figure 5B:
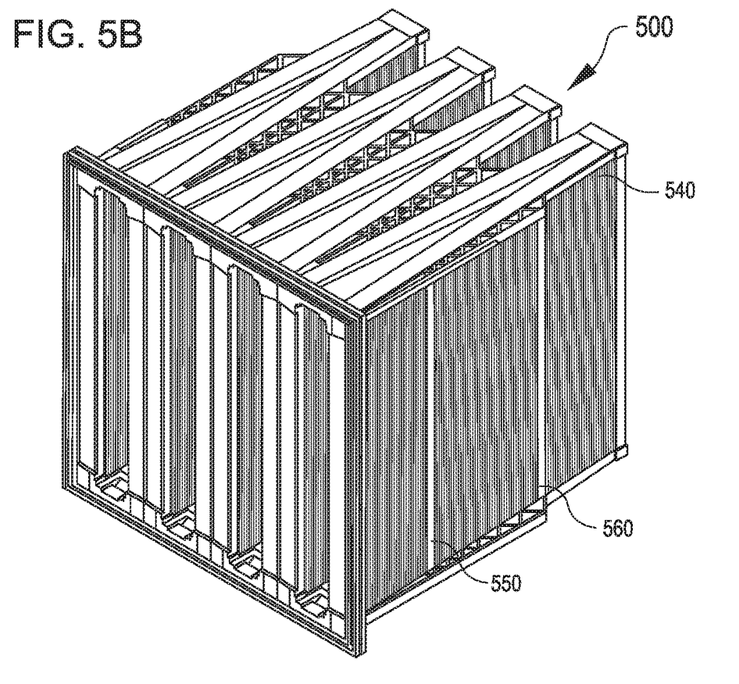
FIG. 5B shows a perspective view of a filter assembly including support members in a vertical position according to embodiments of the present invention.

FIG. 5A presents a perspective view of a filter assembly 500 including support members 550 and 560 according to some embodiments of the present invention. The orientation of the pleated configuration may be horizontal as shown in FIG. 5A or may be vertical as shown in FIG. 5B. The illustrated filter assembly includes a V-panel filter frame 505 including a header structure 510 and an end cap structure 520. Additionally, the filter assembly 500 may include a plurality of top side plate 530 and bottom side plate 535, which may couple header structure 510 with end cap structure 520. In one embodiment, the end cap structure 520 may include an end cap coupled to top side plate 530 and bottom side plate 535. Positioned within filter assembly 500 may be one or more filter pleated media 540 coupled to top side plate 530 and bottom side plate 535. Filter pleated media 540 may be characterized by an upstream surface 542 and a downstream surface 544 opposite to upstream surface 542 in a direction of flow through filter assembly 500. The filter pleated media may be characterized by pleated configuration. It is to be understood that although a pleated configuration will be discussed throughout, any variety of filter surface configurations may be utilized with, and are encompassed by, the present invention.

In one embodiment, the filter assembly 500 may be a V-panel filter assembly having two or more filter pleated media extending in a tapered manner from the header structure to the end cap structure. Additionally, filter pleated media 540 coupled to each end cap 520 may diverge from one another as the filter pleated media extends to the header structure 510. V-panel filter assemblies may include any number of actual V-panels, each having two filter pleated media 540. For example, V-panel filters may have 1 V-panel, e.g., 2 V-panels, 3 V-panels, 4 V-panels, 5 V-panels, 6 V-panels, 7 V-panels, or 8 V-panels, or more coupled to the header structure 510. Each filter pleated media 540 may be a single filter media extending between the top side plate 530 and the bottom side plate 535 from the header structure 510 to the end cap structure 520. For example, a single pleat pack may extend continuously within the defined space between the top and the bottom side plate, the header structure, and the end cap structure associated with that filter media. Additionally, each filter pleated media 540 may have a pleated configuration between a top of the filter media and a bottom of the filter media. Each filter pleated media may be coupled to header structure 510 and end cap of end cap structure 520 in a tapered configuration between top side plate 530 and bottom side plate 535. In some embodiments, multiple filter pleated media may be coupled to one another and supported within the same structure.

As shown in FIG. 5A, support members 550 and 560 utilized with the filter assembly 500 may be positioned along the downstream surface 544 of the filter media 540. Support members 550 and 560 may be positioned at any location along the downstream surface, and may be spaced apart relative to one another and/or the top side plate 530 or bottom side plate 535. In some embodiments, support member 550 and support member 560 are positioned substantially equidistant from each other as described herein.

In one embodiment, components of the filter assembly and frame, including the header structure, end cap structures, top and bottom side plates, and support members may be formed of a rigid or semi-rigid construction. The components may be or may include any number of materials that may provide structural characteristics or performance characteristics based on the particular filter application. The components may be molded or extruded and may include plastics, thermoplastics, thermosets, ceramics, carbon fiber, and/or metals. Materials used in any of the components may include, but are not limited to, polystyrene, polycarbonate, acrylic, acrylonitrile butadiene styrene (ABS), polyamide, acetal, polyvinyl chloride, cellulose, polyester, polyethylene, fluoroplastics, polyimide, polyamide, polypropylene, polysulfone, melamine, phenolic, urethane, polyetheretherketone, perfluoroalkoxy, polyvinylidene fluoride, filled composites including those filled with glass, carbon fibers, pigments, or metals, and/or any combination of these materials.

Filter Media

Materials used for the filter media may include any number of materials chosen for particular properties including strength, corrosion resistance, weight, and rigidity. The materials may include woven and non-woven materials including microfiberglass, cellulose, spunbond, meltblowns, membranes, and combinations of any of these materials. The filter media may also include an electrospun nanofiber web, e.g. nylon, PVDF, and microporous polymeric membrane, including, for example, polytetrafluoroethylene, polypropylene, and polyethylene, which may aid with repelling water penetration. The filter media may be chosen or developed based on particular requirements for the application for which it will be employed, and may include a Minimum Efficiency Reporting Value ("MERV") rating from 1 to 16 per ASHRAE 52.2 test standard, or E10 to U17 per EN1822-2009 test standard, for example. For applications in which the fluid to be filtered includes a liquid, any similar materials or combination discussed throughout this disclosure may be included, and may be used for filtration at any number of ratings. These ratings may include absolute or nominal ratings, including at least about 100 microns, e.g., at least about 1,000 microns, at least about 50 microns, at least about 40 microns, at least about 25 microns, at least about 10 microns, at least about 8 microns, or at least about 2 microns.

The filter media may include a microporous polymeric membrane. Microporous polymeric membranes have demonstrated dependability and reliability in removing particles and organisms from fluid streams. Such microporous membranes may be characterized by their polymeric composition, air permeability, water intrusion pressure and filtration efficiencies. A variety of microporous polymeric membranes can be used, depending on the requirements of the application. The microporous polymeric membrane may be constructed from materials including nitrocellulose, triacetyl cellulose, polyamide, polycarbonate, polyethylene, polypropylene, polytetrafluoroethylene, polysulfone, polyvinyl chloride, polyvinylidene fluoride, or acrylate copolymer.

For a variety of fluid applications, the filter media may include a hydrophobic material that is capable of preventing the passage of water, but may pass one or more other fluids or other materials, in which case the filter media may be able to withstand the applied differential pressure across the filter media without any liquid passing through. The membrane may have a water intrusion pressure from about 0.2 bar to about 1.5 bar and an average air permeability from about 7 Frazier to about 100 Frazier or from about 10 Frazier to about 40 Frazier, as determined under test standard ASTM F778 (1993). The filter media may also include a microporous fluoropolymer, such as polytetrafluoroethylene (PTFE), fluorinated ethylenepropylene (FEP), perfluoroalkoxy polymer (PFA), polypropylene (PP), polyurethane (PU), polyethylene (PE), or ultra-high molecular weight polyethylene (UHMWPE). The filter media may also include expanded polytetrafluoroethylene (ePTFE) membranes in various embodiments.

Filter media may optionally contain a filler material to improve certain properties of the filter. Suitable fillers may include, but are not limited to, carbon black or other conductive filler, catalytic particulate, fumed silica, colloidal silica, or adsorbent materials such as activated carbon, or ceramic fillers, such as activated alumina, and titanium dioxide. As noted, the filter media may include a melt blown material in the form of a web. The filter media may include one or more melt blown polymer fiber web layers that may be made from a variety of polymeric materials, including, but not limited to, polypropylene, polyester, polyamide, polyvinyl chloride, polymethylmethacrylate, and polyethylene, and combinations thereof. The polymer fibers that form the web may have a diameter in the range of about 0.5 microns to about 10 microns or more. The basis weight of a melt blown polymer fiber web may, for example, be in the range from about 1 $g/m^2$ to about 100 $g/m^2$. A melt blown filtration media may include one or more electric filter media layers. Electric charge can be imparted to melt blown fibrous webs to improve their filtration performance using a variety of techniques. For example, a suitable web may be conveniently cold charged by sequentially subjecting the web to a series of electric fields, such that adjacent electric fields have substantially opposite polarities with respect to each other. In one embodiment, electret filter materials may also be made by a variety of other techniques. Any combination of filter media materials may similarly be employed including filter media having a microporous polytetrafluoroethylene membrane and an electrostatic melt blown web.

The filter media may also include nanofibers in one embodiment including those produced by electrostatic spinning (electrospinning) processes, which may produce synthetic fibers of small diameter and high surface areas. Additional or alternative nanofiber production methods may similarly be employed. A variety of materials including glass and polymers may be utilized as the nanofibers. For example, polymers used may include, but are not limited to, polyvinyl chloride (PVC), polyolefin, polyacetal, polyester, cellulose ether, polyalkylene sulfide, polyarylene oxide, polysulfone, modified polysulfone polymers and polyvinyl alcohol, polyamide, polystyrene, polyacrylonitrile, polyvinylidene chloride, polymethyl methacrylate, and polyvinylidene fluoride.

Bridge Members

Figure 6:
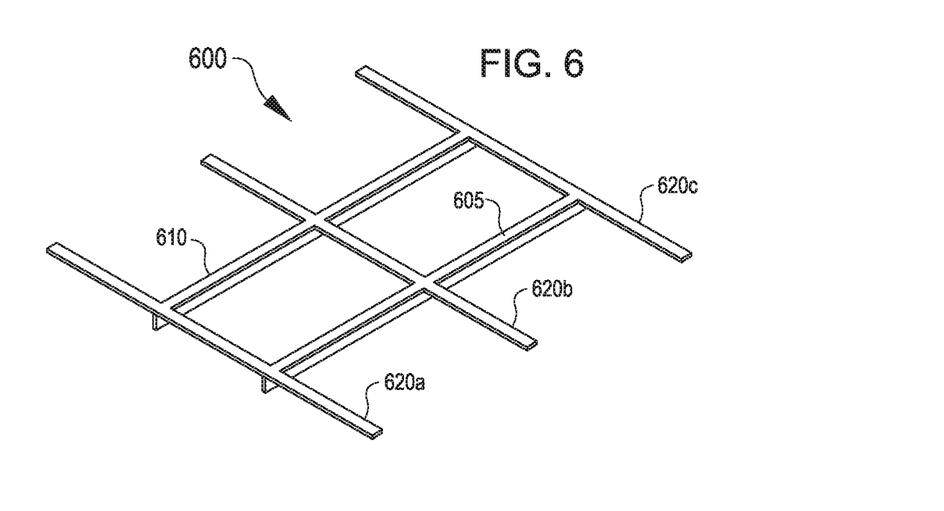
FIG. 6 shows a perspective view of a support structure according to embodiments of the present invention.

FIG. 6 shows a perspective view of a support structure 600 according to some embodiments of the present invention. As shown, support members 605 and 610 are coupled to one another to form a support structure. As shown, support structure 600 includes two support members 605, 610 and three bridge members 620a, 620b and 620c. Of course, other arrangements and numbers of support members and bridge members may be employed without deviating from the present invention. Bridge members 620a and 620c may be positioned to connect with the filter assembly within the header structure and end cap structure as previously described. In one embodiment, bridge members 620a, 620b and 620c may provide additional structural integrity on the downstream surface of the filter pleat pack. Also, bridge members 620a, 620b and 620c may provide spacing for support members 605 and 610 in a substantially equidistant manner. For purposes of the present invention, bridge members are constructed and arranged to collectively restrict no more than about 30% of the downstream surface area of the filter pleated media, and may restrict no more than about 25%, e.g., no more than about 20%, no more than about 15%, no more than about 10%, no more than about 5%, or less of the downstream surface area. In one embodiment, bridge members are constructed and arranged so as not to be in a cage or netting structure, which may provide further restriction of the surface area.

The support members may include any of the features or profiles previously described. As indicated above, support members may include a greater or lesser number of support members and a greater or lesser number of bridge members than illustrated. For example, in one embodiment, two or more support members may be coupled to one another on at least one end of each support member by a bridge member. In such embodiments, there is no central bridge member.

Support members 605 and 610 and bridge members 620*a*, 620*b*, and 620*c* may be formed of the same or different materials. As one non-limiting example, support members 605 and 610 and bridge member 620*b* may include a plastic, such as a thermoplastic, or a metal, and the bridge members 620*a* and 620*c* may independently comprise a plastic, such as a thermoplastic, or a metal.

By coupling within these structures, the bridge members may not restrict any surface area of the filter pleated media, or little surface area of the filter pleated media. For example, a potting material may be flowed or positioned within the header structure, within the end cap structure, or on the bridge members 620*a* and 620*c* and coupled to the mating components. In these configurations, potting material may or may not be included along the support members or filter pleated media. Additional bridge members 620*a*, 620*b* and 620*c* may be positioned along the downstream surface of the filter pleat pack in a perpendicular orientation to the support members, such as is illustrated with bridge member 620*b*. These bridge members may be coupled directly with the side plates, support members, and/or the filter pleated media. These bridge members may provide additional support for high pressure applications, or other applications in which additional structural support may be useful. In one embodiment, the support structure 600 may be a single piece design, such as from an injection molding process.

Figure 7:
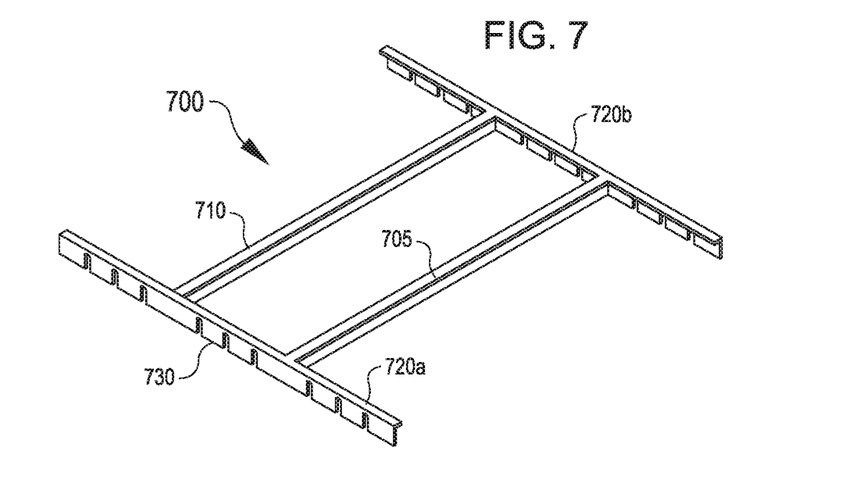
FIG. 7 shows a perspective view of a support structure according to embodiments of the present invention.

FIG. 7 shows a perspective view of a support structure 700 according to another embodiment of the invention. Support structure 700 may include similar components as support structure 600 described above, and, as shown, includes support members 705 and 710 and bridge members 720*a* and 720*b*. Bridge members 720*a* and 720*b* may additionally be characterized by a plurality of tabs 730 along a length of each bridge member. The tabs 730 may be of similar or different lengths. For example, tabs crossing the connection of a support member 705 and 710, respectively, may be longer to ensure that a gap does not occur proximate the support member, which may provide a fault point in the structure when under stress. In some embodiments, the bridge members 720*a* and/or 720*b* may be characterized by an L-shape, allowing a portion of the L to couple to support members 705 and 710 and another portion to couple within the header structure and end cap structure as described above. Tabs 730 may be separated from one another by gaps, and in some embodiments the bridge member defines gaps between each or some of the tabs of the plurality of tabs. The gaps and tabbed structure of the bridge members may allow for improved coupling between components. For example, potting material may be flowed through the gaps and about the tabs in order to provide improved distribution of the potting material between the bridge members and header structure and end cap structure, which may provide enhanced adhesion and fewer break points in the design.

Filter Method

Figure 8:
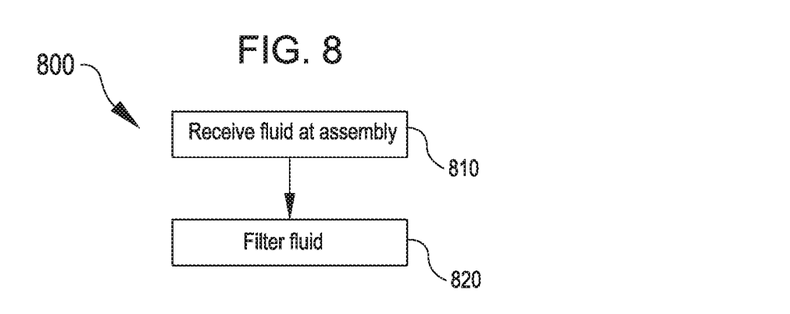
FIG. 8 shows a simplified flow diagram of a method of filtering a fluid according to embodiments of the present invention.

The systems and devices previously described may be used in various methods. As illustrated in FIG. 8, method 800 includes selected operations of a method of filtering a fluid according to embodiments of the present invention. The method may include receiving a fluid at a filter assembly at operation 810. The filter assembly may include any of the components previously described, and in some examples, may include a frame having a header structure and an end cap structure, where a plurality of side plates couple the header structure with the end cap structure. The filter assembly may also include a filter pleated media coupled, e.g., fixedly coupled, with the plurality of side plates, where the filter pleated media may be characterized by an upstream surface and a downstream surface opposite the upstream surface in a direction of fluid flow through the filter assembly. The filter pleated media may have a pleated configuration in one embodiment. The filter assembly may also include a support member coupled to the header structure and the end cap structure along the downstream surface of the filter pleat pack, where the support member at least partially penetrates the pleated configuration and extends between at least two pleats of the pleated configuration of the filter pleated media. In one embodiment the filter assembly may include a filter pleated media and support member as previously described. Method 800 also includes filtering the received fluid by the filter assembly at operation 820. The fluid may cause a deflection from a vertical axis of the filter pleated media of no more than about 25 mm at any position along the filter pleated media, as described above.

The methods may be performed in general filter operations or in testing operations, and may include additional operations. For example, a testing method may also include loading the filter pleated media prior to receiving the fluid at operation 710. For example, certain testing operations include loading a filter pleated media with dust and/or water at a particular flow rate over a period of time prior to performing the test, which may include the receiving and/or the filtering operations described. In one embodiment the receiving operation may include a test condition, such as a burst test for a filter. One non-limiting example of a burst test includes subjecting the loaded filter to dust and water until the pressure drop reaches a target pressure, e.g., 62.5 kPa. Additional operations during testing or performance may include measuring fluid effects on the filter. These effects may include corrosion, damage, or deflection from a center of the filter pleated media as well as at any other point along the filter pleated media. It is to be understood that any of these operations may be performed in exemplary methods encompassed by the present invention.

Methods of manufacture of a filter assembly having support members are similarly disclosed and may include coupling one or more support members with a filter pleated media. Any of the support member configurations or filter media materials previously described may be used in the manufacturing. The coupling may include utilizing a potting material to join the support member with the filter pleated media. Additional operations may include coupling the support member or a support structure as previously described with additional frame portions of a filter assembly including a header structure, an end cap structure, and/or side plates as previously described. The operations may include utilizing a potting material to couple the support member, support structure, and/or filter pleated media with the frame components. Additional operations may include testing of the filter as previously described, as well as testing of the manufacturing process to ensure compliance with any applicable standards both internal and external to the operation.

In the preceding description, for the purposes of explanation, numerous details have been set forth in order to provide an understanding of various embodiments of the present invention. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present invention. Accordingly, the above description should not be taken as limiting the scope of the present invention or claims.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the present invention, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Thus, for example, reference to "a filter" includes a plurality of such filters, and reference to "the support member" includes reference to one or more support members and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

EXAMPLES

Testing was performed on filter assemblies that did and did not have support members as previously described. The results of burst testing are included with the particular examples.

Example 1

A V-panel filter with 4 'V' panels, including 8 filter pleat packs, was tested. The V-panel filter had dimensions of 594 mm in height, 594 mm in width, and 607 mm in depth. The V-panel was made without utilizing support members in the pleat pack. The initial pressure drop across the V-panel filter was measured and determined to be 156 Pa at 4,250 $m^3$/hr. The V-panel filter was then loaded with dust at a flow rate of 4,250 $m^3$/hr until it reached 1000 Pa. The deflection at the center of the pleat pack was measured at 50 mm. This was deemed excessive and no burst test was conducted.

Example 2

A similar V-panel filter as described in Example 1 was made, however each pleat pack of the V-panel filter included T-shaped support members made of ABS plastic as previously described. The support members were 3.175 mm in thickness, 25.4 mm in width at least partially disposed within the pleated configuration, and 19 mm in height along the downstream surface of the pleat pack of the filter media. Two of these support members were placed on the downstream surface of each pleat pack. A support member was located at a distance of ⅓ and ⅔ from the top of each pleat pack. The pleat packs were assembled into a V-panel filter. In testing, the initial pressure drop was measured and determined to be 176 Pa at 4,250 $m^3$/hr. After dust loading according to similar procedures described in Example 1, the deflection at the center of the pleat pack was not noticeable. The filter was then subjected to dust and water until the pressure drop was 62.5 kPa. The V-panel with support members coupled to the pleat packs did not allow dust and water to bypass to the clean side, thus passing the burst test.

Example 3

A first V-panel filter was made similar to that in Example 1, which did not include support members. A second V-panel filter was made similar to that in Example 2, which included one support member of ABS plastic per pleat pack as described in that Example. A third V-panel filter was made similar to that in Example 2, which included two support members per pleat pack positioned at the ⅓ and ⅔ height positions of the filter media. Pressure testing was performed on all three V-panel filters. The second and third V-panel filters exhibited no outward deflection up to a pressure drop of 1 kPa. The first V-panel filter exhibited an outward deflection of 25 mm at the center of the pleat pack at 1 kPa pressure drop.

Example 4

Figure 9:
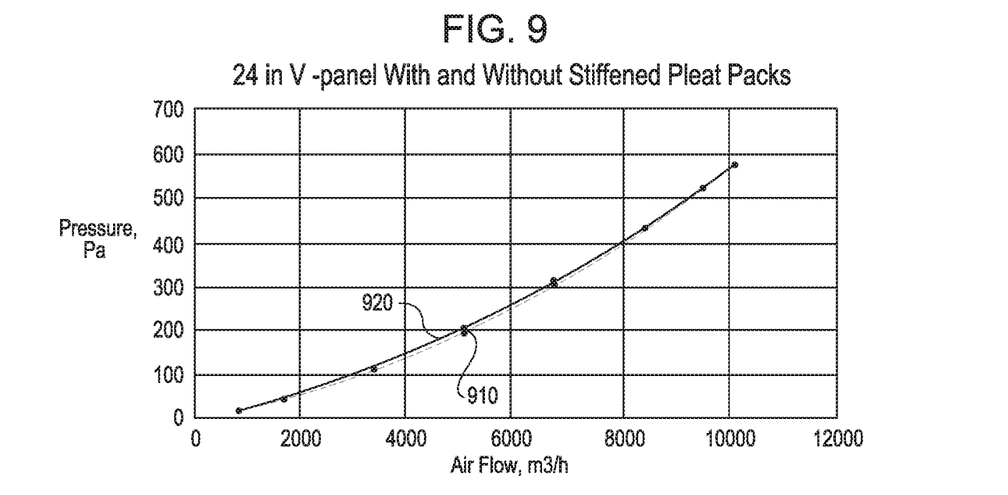
FIG. 9 presents testing data comparing a conventional filter assembly with a filter assembly having support members according to embodiments of the present invention.

A first V-panel filter was made similar to that in Example 1, which did not include support members according to the present invention. A second V-panel filter was made similar to that in Example 2, which included two support members per pleat pack positioned at the ⅓ and ⅔ height positions of the filter media. Airflow testing was performed on both V-panel filters. FIG. 9 illustrates the comparative testing data between the first V-panel filter as illustrated by line 910, and the second V-panel filter as illustrated by line 920. As illustrated, the support members caused an increase in pressure across the filter of less than 15% or less than 10% at all airflows from below 2,000 $m^3$/hr up to over 9,000 $m^3$/hr.

In the following, further examples are described to facilitate the understanding of the disclosure:

E1. A filter assembly, comprising a frame having a header structure, an end cap structure, and a plurality of side plates coupling the header structure to the end cap structure; a filter pleated media coupled to the plurality of side plates, wherein the filter pleated media comprises an upstream surface and a downstream surface opposite the upstream surface in a direction of flow through the filter assembly, and wherein the filter pleated media comprises a plurality of pleats in a pleated configuration; and a support member coupled to a portion of the frame, and positioned along at least one of the upstream surface or the downstream surface of the filter pleated media, wherein the support member at least partially penetrates the pleated configuration.

E2. The filter assembly of any of the previous or subsequent examples, wherein the support member is positioned along the upstream surface of the filter pleated media.

E3. The filter assembly of any of the previous or subsequent examples, wherein the support member is positioned along the downstream surface of the filter pleated media.

E4. The filter assembly of any of the previous or subsequent examples, wherein the support member is coupled to the header structure and the end cap structure.

E5. The filter assembly of any of the previous or subsequent examples, wherein the support member is coupled to one or more of the plurality of side plates.

E6. The filter assembly of any of the previous or subsequent examples, wherein the support member is aligned with the pleated configuration.

E7. The filter assembly of any of the previous or subsequent examples, wherein the filter assembly comprises a V-panel filter assembly having two filter pleated media extending at a taper from the header structure to the end cap structure.

E8. The filter assembly of any of the previous or subsequent examples, wherein the filter pleated media comprises a single pleat pack extending between the side plates from the header structure to the end cap structure.

E9. The filter assembly of any of the previous or subsequent examples, wherein the support member comprises two support members positioned at different locations across the filter pleated media.

E10. The filter assembly of any of the previous or subsequent examples, wherein the support member comprises a T-shape cross-section having a first portion extending along the downstream surface of the filter pleat pack, and a second portion extending into the pleated configuration between at least two pleats of the filter pleated media.

E11. The filter assembly of any of the previous or subsequent examples, wherein the support member comprises at least two support members along at least one of the upstream surface or the downstream surface of the filter pleat pack.

E12. The filter assembly of any of the previous or subsequent examples, wherein the support member comprises a plastic, thermoplastics, thermosets, ceramics, or carbon fiber, metal, or combinations thereof.

E13. The filter assembly of any of the previous or subsequent examples, wherein the support member has a width greater than the pleat width, wherein the width of the support member is no more than about 100 mm.

E14. The filter assembly of any of the previous or subsequent examples, wherein the support member restricts no more than about 30 percent of the upstream or the downstream surface area of the filter pleated media transverse to the flow.

E15. The filter assembly of any of the previous or subsequent examples, wherein the filter assembly is configured to substantially maintain its structure against a differential pressure of at least 62.5 kPa.

E16. The filter assembly of any of the previous examples, wherein the support member comprises a plurality of support members that are coupled to one another.

E17. A V-panel filter assembly, comprising a frame having a header structure and an end cap structure, wherein a plurality of side plates couple the header structure with the end cap structure, and wherein the end cap structure comprises an end cap coupled to two of the plurality of side plates; two filter pleated media coupled to the plurality of side plates, wherein each of the filter pleated media comprises an upstream surface and a downstream surface opposite the upstream surface in a direction of flow through the filter assembly, wherein each of the filter pleated media comprises a pleated configuration between a top of the filter pleated media and a bottom of the filter pleated media, and wherein each of the filter pleated media is coupled to the header structure and the end cap in a tapered configuration, wherein the filter pleated media comprises plurality of pleats in a pleated configuration; and at least two support members each coupled to and along the at least one of the upstream surface or the downstream surface of each of the filter pleated media, wherein at least a portion of each of the at least two support members at least partially penetrates within the pleated configuration and extends within a pleat of the pleated configuration of the filter pleated media.

E18. The V-panel filter assembly of any of the previous or subsequent examples, wherein the at least two support members are positioned along the upstream surface of the filter pleated media.

E19. The V-panel filter assembly of any of the previous or subsequent examples, wherein the at least two support members are positioned along the downstream surface of the filter pleated media.

E20. The V-panel filter assembly of any of the previous or subsequent examples, wherein the at least two support members are coupled to the header structure and the end cap structure.

E21. The V-panel filter assembly of any of the previous or subsequent examples, wherein the at least two support members are coupled to one or more of the plurality of side plates.

E22. The V-panel filter assembly of any of the previous or subsequent examples, wherein the at least two support members are aligned with the pleated configuration.

E23. The V-panel filter assembly of any of the previous or subsequent examples, wherein the support member comprises two support members positioned at different location across the filter pleated media.

E24. The V-panel filter assembly of any of the previous or subsequent examples, wherein the plurality of support members are each positioned substantially equidistant from at least one other support member and the top or the bottom of the filter pleated media or from at least two other support members.

E25. The V-panel filter assembly of any of the previous or subsequent examples, wherein the filter pleated media comprises a spunbond polymer fibrous media.

E26. The V-panel filter assembly of any of the previous or subsequent examples, wherein the filter pleated media comprises expandable polytetrafluoroethylene.

E27. The V-panel filter assembly of any of the previous or subsequent examples, wherein the at least two support members restricts no more than about 30 percent of the upstream or the downstream surface area of the filter pleated media.

E28. The V-panel filter assembly of any of the previous or subsequent examples, wherein the two filter pleated media within the frame are each configured to deflect outwardly no more than about 20 mm from a vertical axis of the filter pleated media with a differential fluid pressure across the upstream and downstream surface of the filter pleat pack of at least about 1 kPa.

E29. The V-panel filter assembly of any of the previous examples, wherein the V-panel filter assembly is configured to substantially maintain its structure against a differential pressure of 62.5 kPa or more.

E30. A method of filtering a fluid, the method comprising receiving the fluid at a filter assembly, wherein the filter assembly comprises: a frame having a header structure and an end cap structure, wherein a plurality of side plates couple the header structure with the end cap structure, a filter pleated media coupled to the plurality of side plates, wherein the filter pleated comprises an upstream surface and a downstream surface opposite the upstream surface in a direction of fluid flow through the filter assembly, and wherein the filter pleated media comprises a pleated configuration, and a support member coupled to a portion of the frame, and positioned along at least one of the upstream surface or the downstream surface of the filter pleated media, wherein the support member at least partially penetrates the pleated configuration and extends within a pleat of the pleated configuration of the filter pleated media; and filtering the fluid by the filter assembly, wherein the fluid causes a deflection from a vertical axis of the filter pleated media of less than about 25 mm at any position along the filter pleated media.

E31. The method of any of the previous or subsequent examples, wherein the filter assembly is configured to substantially maintain its structure against a differential pressure exerted by the fluid of at least 62.5 kPa.

E32. The method of any of the previous examples, wherein the support member causes a differential pressure increase across the filter pleated media in operation of less than about 10 percent more than the differential pressure across the filter pleated media in absence of the support member.

E33. A filter assembly comprising a filter pleated media, wherein the filter pleated media comprises an upstream surface and a downstream surface opposite the upstream surface in a direction of fluid flow through the filter assembly, and wherein the filter pleated media comprises a pleated configuration; and a support member coupled to at least one of the upstream surface or the downstream surface of the filter pleated media, wherein at least a portion of the support member extends within a pleat of the pleated configuration of the filter pleated media.

E34. The filter assembly of any of the previous or subsequent examples, wherein a height of the support member is similar to the height of a single pleat of the pleated configuration of the filter pleated media.

E35. The filter assembly of any of the previous or subsequent examples, wherein the support member comprises a T-shape cross-section having a first portion extending along at least one of the upstream or the downstream surface of the filter pleat media, and a second portion extending into the pleated configuration within a pleat of the filter pleat media.

E36. The filter assembly of any of the previous or subsequent examples, wherein the first portion of the support member comprises at least one aperture.

E37. The filter assembly of any of the previous or subsequent examples, wherein the filter assembly comprises two or more support members.

E38. The filter assembly of the previous example, wherein the two or more support members are coupled to one another on at least one end of each support member by a bridge member.

E39. The filter assembly of any of the previous or subsequent examples, wherein the bridge member comprises a plurality of tabs along a length of the bridge member, and wherein the bridge member defines a gap between tabs of the plurality of tabs.

E40. A filter assembly comprising a filter pleated media, wherein the filter pleated media comprises an upstream surface and a downstream surface opposite the upstream surface in a direction of fluid flow through the filter assembly, and wherein the filter pleated media comprises a pleated configuration; and a support member coupled to the upstream surface of the filter pleated media, wherein at least a portion of the support member extends within a pleat of the pleated configuration of the filter pleated media.

E41. A filter assembly comprising a filter pleated media, wherein the filter pleated media comprises an upstream surface and a downstream surface opposite the upstream surface in a direction of fluid flow through the filter assembly, and wherein the filter pleated media comprises a pleated configuration; and a support member coupled to the downstream surface of the filter pleated media, wherein at least a portion of the support member extends within a pleat of the pleated configuration of the filter pleated media.

What is claimed is:

1. A V-panel filter assembly, comprising:
a frame having a header structure and an end cap structure, wherein a plurality of side plates couple the header structure with the end cap structure, and wherein the end cap structure comprises an end cap coupled to two of the plurality of side plates;
two filter pleated media coupled to the plurality of side plates, wherein each of the filter pleated media comprises an upstream surface and a downstream surface opposite the upstream surface in a direction of flow through the filter assembly, wherein each of the filter pleated media comprises a pleated configuration between a top of the filter pleated media and a bottom of the filter pleated media, and wherein each of the filter pleated media is coupled to the header structure and the end cap in a tapered configuration, wherein the filter pleated media comprises plurality of pleats in a pleated configuration; and
at least two support members each coupled to and along the downstream surface of each of the filter pleated media,
wherein at least a portion of each of the at least two support members at least partially penetrates within the pleated configuration and extends within a pleat of the pleated configuration of the filter pleated media,
wherein the at least two support members comprise a T-shape cross-section having a first portion extending along the downstream surface of the filter pleated media, and a second portion extending into the pleated configuration between at least two pleats of the filter pleated media, wherein the width of a single pleat of the filter pleated media is within +/−20% of the width of the first portion of the support members, wherein the at least two support members are positioned and spaced apart from one another and from the frame in a manner within equidistant +/−50 mm, wherein the at least two support members restricts no more than about 30 percent of the downstream surface area of the filter pleated media, and wherein the V-panel filter assembly is configured such that it does not have catastrophic failure at a differential pressure of at least 62.5 kPa in a burst test.

2. The V-panel filter assembly of claim 1, wherein the filter pleated media comprises one of spunbond polymer fibrous media or an expandable polytetrafluoroethylene.

3. The V-panel filter assembly of claim 1, wherein the at least two support members are equidistantly positioned and spaced apart from one another and from the frame.

4. The V-panel filter assembly of claim 1, wherein the two filter pleated media within the frame are each configured to deflect outwardly no more than about 20 mm from a vertical axis of the filter pleated media with a differential fluid pressure across the upstream and downstream surface of the filter pleated media of at least about 1 kPa.

5. A method of filtering a fluid, the method comprising:
receiving the fluid at a filter assembly, wherein the filter assembly comprises:
   a frame having a header structure and an end cap structure, wherein a plurality of side plates couple the header structure with the end cap structure,
   a filter pleated media coupled to the plurality of side plates, wherein the filter pleated media comprises an upstream surface and a downstream surface opposite the upstream surface in a direction of fluid flow through the filter assembly, and wherein the filter pleated media comprises a pleated configuration, and
   at least two support members coupled to a portion of the frame, and coupled to and along the downstream surface of the filter pleated media,
      wherein the at least two support members at least partially penetrate the pleated configuration and extend within a pleat of the pleated configuration of the filter pleated media; and
filtering the fluid by the filter assembly, wherein the fluid causes a deflection from a vertical axis of the filter pleated media of less than about 25 mm at any position along the filter pleated media,
   wherein the at least two support members comprise a T-shape cross-section having a first portion extending along the downstream surface of the filter pleated media, and a second portion extending into the pleated configuration, between at least two pleats of the filter pleated media,
   wherein the width of a single pleat of the filter pleated media is within +/−20% of the width of the first portion of the support members,
   wherein the at least two support members are positioned and spaced apart from one another and from the frame in a manner within equidistant +/−50 mm, and
   wherein the at least two support members restricts no more than about 30 percent of the downstream surface area of the filter pleated media in a burst test.

6. The method of claim 5, wherein the at least two support members cause a differential pressure increase across the filter pleated media in operation of less than about 10 percent more than the differential pressure across the filter pleated media in absence of the at least two support members.

* * * * *